April 28, 1964 E. P. AGHNIDES 3,130,916
WATER AERATING DEVICE
Filed Aug. 2, 1961

INVENTOR
Elie P. Aghnides

BY Moore & Hall
ATTORNEYS

United States Patent Office 3,130,916
Patented Apr. 28, 1964

3,130,916
WATER AERATING DEVICE
Elie P. Aghnides, 46 W. 54th St., New York 19, N.Y.
Filed Aug. 2, 1961, Ser. No. 128,803
9 Claims. (Cl. 239—427)

This invention relates to water aerating devices, and more particularly to a disc useful in aerators adapted to fit on water faucets for giving the water a preliminary aeration before the water strikes the mixing screens.

Conventional water aerators used on faucets comprise one or more upstream perforated discs which project one or more jets of water on to a mixing means, usually superposed screens, where the water is finely broken up and mixed with air. If the screens and the holes in the discs are properly proportioned, with respect to each other, a coherent jet of water laden with numerous small bubbles will be discharged from the mixing means.

In my prior copending applications Serial No. 640,859, filed February 18, 1957, entitled "Water Aerators," Serial No. 752,500, filed August 1, 1958, entitled "Water Aerators," and Serial No. 831,588, filed August 4, 1959, entitled "Faucet Aerators," which three applications have issued, respectively, into U.S. Patents Nos. 2,998,929; 2,998,933 and 2,998,931, respectively, all dated September 5, 1961, I have disclosed certain improvements in the jet-forming means of the aerators. The aforesaid patents disclosed a jet-forming disc capable of giving the water a preliminary aeration and also placing the water in such a state that when it strikes the mixing means, it is mixed more efficiently and enables the aerator to have greater output of bubble-laden water than was the case with prior devices. This application is a continuation-in-part of my copending U.S. Patent No. 2,998,931.

The present application discloses certain modified devices for accomplishing the same general purpose as is accomplished in said prior patents. The devices of the present application have advantages in certain circumstances.

It is an object of this invention to provide an improved low cost upstream disc for a faucet aerator. Another object of this invention is to provide a more efficient water aerator than has been provided by the prior art when bubbly streams of unusually large cross-sections are desired.

In carrying out this invention, I provide an annular opening with a bridge on its upstream side, the bridge defining a plurality of restricted inlet holes for allowing water to enter the annular opening.

Other objects, advantages, and details of construction of the invention will appear as this description proceeds.

Figure 1:
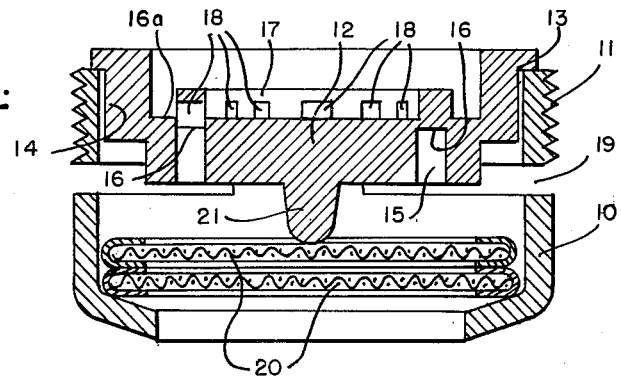
FIGURE 1 is a cross-sectional view of the preferred form of this invention.

In FIGURE 1, a casing 10 has external threads. A disc 12 of molded material, preferably polyethylene, has a flange 13 which extends over the upper end of the casing 10 and is clamped or squeezed between the top of the casing and the conventional ledge which is present in all of the faucets which have internal threads. Therefore, when the aerator casing 10 is secured into the faucet by tightening the threaded connection between the casing and the faucet, the flange 13 is compressed between the faucet and the aerator. Since flange 13 may be made of soft material it will act as a washer, thereby preventing water from leaking to the outside surface of the aerator. The molded disc 12 has a vertical portion 14 of slightly smaller outside diameter than the inside diameter of the casing 10, whereby the disc 12 is centered in the casing 10. The disc 12 has an annular opening or slot 15, which in the form shown is a continuous opening, although it need not necessarily be continuous. This opening or slot extends from the bottom end of the disc 12 up to the level 16, and the disc 12 is a solid plate between the level 16 and its surface 16a except for the openings 18 hereinafter mentioned. Located immediately above the annular opening 15 is an annular bridge 17 which covers the entire surface of disc 12 which is above the opening 15. The bridge 17 contains a plurality of lateral holes 18, and in the particular form of the device shown there are twelve such holes 18 distributed around the bridge. These holes 18 extend laterally completely through the bridge and also extend below the level of the surface 16a by approximately one-half millimeter to the level 16. Slot 19 in the side wall of the casing 10 admits air to the downstream end of slots 15.

The novel disc hereinbefore described performs its important function as follows: Water, under pressure from the faucet, enters through openings 18 and therefore forms a total of twelve spaced streamlets of water entering the annular opening 15. These twelve spaced streamlets impinge upon the sidewall of the opening 15 and are thereby preliminarily mixed with air entering through inlet 19 and the downstream end of the opening 15, whereby the water is given preliminary aeration before its discharge from the opening 15.

The bridge arrangement including the lateral slots 18, is particularly effective in producing spaced streamlets of water in a form which is especially capable of taking on air in the annular opening 15.

The spray of aerated water from orifice 15 strikes screens 20 where it is finely broken up and mixed with air to form a coherent jet laden with numerous small bubbles, in which condition the water is discharged from the outlet of the device. A projection 21 on disc 12 maintains the screens in a fixed position after the aerator has been installed on the faucet.

Figure 2:
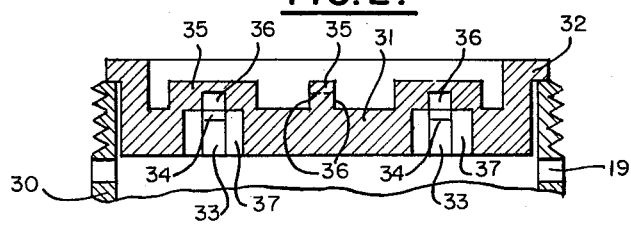
FIGURE 2 is a cross-sectional view of a further modified form of the invention.
Figure 3:
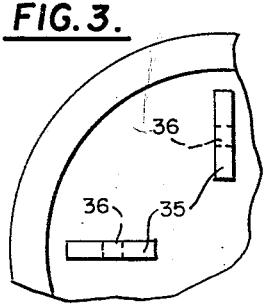
FIGURE 3 is a top view of the device of FIGURE 3.
Figure 4:
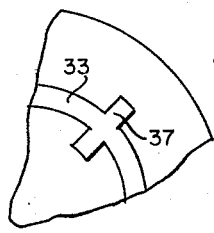
FIGURE 4 is a bottom view of the disc 31 of FIGURE 3.

In FIGURE 2, casing 30 has air inlet 19 the same as in FIGURE 1. A molded disc has flange 32 resting upon the upper end of the casing and performing the same function as the flange 13 of FIGURE 1. An annular slot or opening 33 extends from the bottom surface of the disc up to the level 34. As shown in FIGURE 3, there are four bridges across the disc above the annular opening 33. These bridges 35 include water openings 36 which extend laterally completely through the bridge and down to the level indicated by reference 34. As shown in FIGURE 4, the slot or opening 33 is elongated radially at the four positions immediately under the four bridges 35, thereby to form the four enlargements 37. In certain cases the enlargements 37 could be eliminated. Further, in the constructions of FIGURES 1 and 3, a plurality of annular openings 15 and 33 may be provided under bridges as shown at 17 in FIGURE 1 and at 37 in FIGURE 3.

The water from the faucet enters through the slots 36 and passes under the bridge striking the walls of the radial enlargements 37 where it is given a preliminary mixing with air that has entered through inlet 19.

One characteristic feature of the modified form of FIGURE 2 is the individual bridge with its lateral opening. Another characteristic feature is the enlargement 37 of the slot 33 immediately below the restricted inlets 36 of a given bridge 35. A third characteristic of this form of invention is the combination of bridge 35 and its openings, with the enlargement 37.

In FIGURES 1 and 2, the discs 12 and 31 are about three millimeters thick. While in each case only one annular slot (15 or 33) is shown, the invention is not limited thereto for the reason that there may be plural annular slots as shown and described in my prior copending application Serial No. 752,500, heretofore mentioned, in which event each annular slot would have the same bridge, hole and slot arrangement as does the singular annular slot shown herein. It is, moreover, not necessary for the slots 15, 27 and 33 to be annular for they may be straight elongated slots, or of any other elongated configuration. For example a series of parallel elongated slots is within the scope of the invention, and the enlargements 37 shown in FIGURES 3 and 5 accordingly could be done away with. Although the annular opening 33 in the form shown is continuous, it need not necessarily be continuous.

In connection with each form of the device the water entering the annular slot from the upstream side impinges on the side wall of the slot in the presence of air and is thus partially aerated before its discharge into the screens. FIGURES 1 and 3 are much more effective in this respect than FIGURE 2.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim to have invented:

1. A water aerating device comprising a member having first and second sides, means for applying water under pressure to a first side of the member, the second side being exposed to air and adapted to discharge the water, said member defining at least one elongated channel extending downstream between the two sides in the general direction of flow of water, said channel being entirely open on the downstream side, means upstream said elongated channel serving as a closure therefor, comprising bridge means extending upstream from said first side and located upstream said elongated channel, the side walls of said bridge means having holes communicating with said channel and with the upstream side of said member, said holes producing opposed pairs of jets of water which impinge upon each other and upon the walls of said chamber and are thereby broken up into fine droplets of water which readily entrain air and produce an aerated stream.

2. A water aerating device comprising a member having first and second opposite sides, means for applying water under pressure to the first side and the second side being exposed to air and adapted to discharge the water, said member defining in its second side a slot which is long compared to its width, bridge means located on the first side of the member over the slot and having lateral spaced holes completely through the bridge means whereby water can enter each hole from opposite sides of the bridge and said holes respectively communicating with the upstream end of the slot at spaced locations and directing opposed pairs of jets of water so that the jets impinge upon each other and against the side walls of the slot in the presence of air to deliver a bubbly laminated stream of aerated water.

3. A water aerating device having a disc with first and second opposite sides, means for applying water under pressure to the first side of said disc, the second side of the disc being exposed to air and adapted to discharge the water, at least one continuous elongated bridge above the first side of the disc and having a plurality of spaced lateral holes therethrough, the second side of the disc having at least one continuous elongated slot extending under and having its upstream end closed by said bridge and being in communication at spaced positions at the upper end thereof with the holes in said bridge, said slot receiving opposed pairs of water jets from the holes which impinge upon the side walls of the slot in the presence of air to produce a bubbly splash-free aerated stream.

4. A water aerating device comprising a disc with first and second opposite sides, means for applying water under pressure to the first side of the disc, the second side of the disc being exposed to air and adapted to discharge the water, a plurality of spaced bridges on said first side of the disc, at least one annular slot in the second side of the disc which passes beneath said bridges, each said bridge has a lateral hole extending completely through the bridge, said holes respectively communicating with spaced positions in the slot at the upstream side thereof to project oppositely directed water streams against the sides of the slot in the presence of air.

5. A water aerating device as defined in claim 4 in which the slot is wider beneath the bridges than elsewhere, said oppositely directed water streams comprising opposed impinging pairs.

6. The combination set forth in claim 4, said bridges being radially disposed with the axes of the holes traversing said bridges substantially perpendicular to the said radii, respectively.

7. A water aerating device comprising a member having first and second sides, means for applying water under pressure to the first side of said member, the second side of the member being exposed to air and adapted to discharge the aerated water, said member defining at least one slot which is long as compared to its width and extending along the second side of the member and extending to a substantial depth into the member from the downstream side thereof, said member having on its upstream side thereof channel means for admitting into the slot streams of water from generally opposite directions which impinge upon each other and upon the walls of the slot to expend their kinetic energy in producing a stream of aerated water, said channel means comprising openings entering the slot between the side walls thereof.

8. A water aerating device as defined by claim 7 in which said member has said openings cross the side walls of the slot as they enter the same.

9. A water aerating device as defined by claim 7 in which said member has said openings enter the slot in generally longitudinal relation with the side walls of the slot.

References Cited in the file of this patent

UNITED STATES PATENTS

| | | |
|---|---|---|
| 2,998,929 | Aghnides | Sept. 5, 1961 |
| 2,998,933 | Aghnides | Sept. 5, 1961 |

FOREIGN PATENTS

| | | |
|---|---|---|
| 568,669 | Canada | Jan. 6, 1939 |